US008755319B2

(12) United States Patent
Katukam et al.

(10) Patent No.: US 8,755,319 B2
(45) Date of Patent: Jun. 17, 2014

(54) HOST ROUTE CONVERGENCE

(75) Inventors: Suresh Katukam, San Jose, CA (US);
Navindra Yadav, San Jose, CA (US);
Shree Murthy, San Jose, CA (US);
Abhay Roy, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 1055 days.

(21) Appl. No.: 12/027,977

(22) Filed: Feb. 7, 2008

(65) Prior Publication Data

US 2009/0168682 A1 Jul. 2, 2009

Related U.S. Application Data

(60) Provisional application No. 61/017,630, filed on Dec. 29, 2007.

(51) Int. Cl.
*H04L 12/26* (2006.01)

(52) U.S. Cl.
USPC .......................................................... 370/312

(58) Field of Classification Search
USPC .......................................................... 370/312
See application file for complete search history.

(56) References Cited

U.S. PATENT DOCUMENTS

| | | | | |
|---|---|---|---|---|
| 6,078,575 A * | 6/2000 | Dommety et al. | ............ | 370/338 |
| 7,177,646 B2 * | 2/2007 | O'Neill et al. | ................ | 455/450 |
| 2001/0006519 A1 * | 7/2001 | Voit | ............................. | 370/352 |
| 2002/0031107 A1 * | 3/2002 | Li et al. | ......................... | 370/338 |
| 2003/0003912 A1 * | 1/2003 | Melpignano et al. | ......... | 455/436 |
| 2004/0122952 A1 * | 6/2004 | Kistler et al. | ................. | 709/227 |
| 2005/0063409 A1 * | 3/2005 | Oommen | ..................... | 370/432 |
| 2006/0133341 A1 * | 6/2006 | Chari et al. | ................... | 370/338 |
| 2006/0184663 A1 * | 8/2006 | Takahashi et al. | ........... | 709/224 |
| 2006/0268834 A1 * | 11/2006 | Bajic | ............................. | 370/352 |
| 2008/0020759 A1 * | 1/2008 | Nagarajan et al. | ............ | 455/433 |
| 2008/0267179 A1 * | 10/2008 | LaVigne et al. | .............. | 370/389 |
| 2009/0034470 A1 * | 2/2009 | Nagarajan et al. | ............ | 370/331 |
| 2011/0004913 A1 * | 1/2011 | Nagarajan et al. | ................ | 726/1 |

FOREIGN PATENT DOCUMENTS

| | | | | |
|---|---|---|---|---|
| WO | WO 2005099173 A1 * | 10/2005 | ............... | H04Q 7/38 |
| WO | WO 2006083696 A2 * | 8/2006 | ............... | H04Q 7/24 |

OTHER PUBLICATIONS

Mlinarsky, Metrics and Methods Bring VoWLAN Success, Mar. 1, 2005, Wireless Systems Design, http://electronicdesign.com/article/test-and-measurement/metrics-and-methods-bring-vowlan-success10003.aspx.*

* cited by examiner

*Primary Examiner* — Brandon Renner
*Assistant Examiner* — Faisal Choudhury
(74) *Attorney, Agent, or Firm* — Novak Druce Connolly Bove + Quigg LLP (57) ABSTRACT

In one embodiment, detecting a host device on a port of a forwarder switch in a network, detecting a movement of the host device from a first forwarder switch to a second forwarder switch, and multicast broadcasting an updated device information for the host device to a convergence group switches and a proximity group switches, where the convergence group switches includes switches in the network that are not configured as forwarder switches, and the proximity group switches include forwarder switches grouped together based on radio proximity is provided.

25 Claims, 7 Drawing Sheets

HOST ROUTE CONVERGENCE

RELATED APPLICATIONS

The present application claims priority under §35 U.S.C. 119(e) to U.S. provisional patent application No. 61/017,630 filed Dec. 29, 2007 entitled "Host Route Convergence" assigned to the Assignee of the present application, Cisco Technology, Inc. of San Jose, Calif., the disclosure of which is incorporated herein by reference for all purposes.

TECHNICAL FIELD

The present disclosure relates generally to optimizing networks. More specifically, the present disclosure relates to optimizing the host route convergence in a wireless network by grouping the network switches and limiting the number of switches that receive updates to only those in the associated group.

BACKGROUND

In today's wireless communications world, mobility is a large factor. With the ever increasing speed of wireless connections, mobility requires fast host route convergence, in the order of few milliseconds. Whenever a host moves from one switch to another switch in the network, in order to continue to keep host connections, whether they be established voice calls or data Transmission Control Protocol (TCP) connections, and minimize traffic loss to the host, the network needs to have the latest consistent reachability information about the host as quickly as possible in order to keep the network outages limited.

The routing convergence domain size is limited due to sheer number of messages propagated by the switches when each host/device in the network moves form one switch to another. The flooding of the route update messages sent throughout the entire network utilizes more bandwidth, and consumes processing cycles of the network, thus limiting the number of devices on the network domain. However, not every switch in the network needs to be notified of each individual movement of a host device. Each switch only needs to be notified if a host device movement will cause a change in its own data path, thus, there is much possible room for optimization compared to today's traditional wired and wireless networks.

Overview

In one embodiment of the present disclosure, detecting a host device on a port of a forwarder switch in a network, detecting a movement of the host device from a first forwarder switch to a second forwarder switch, and multicast broadcasting an updated device information for the host device to a convergence group switches and a proximity group switches, where the convergence group switches includes switches in the network that are not configured as forwarder switches, and the proximity group switches include forwarder switches grouped together based on radio proximity is provided.

DESCRIPTION OF EXAMPLE EMBODIMENTS

Figure 1:
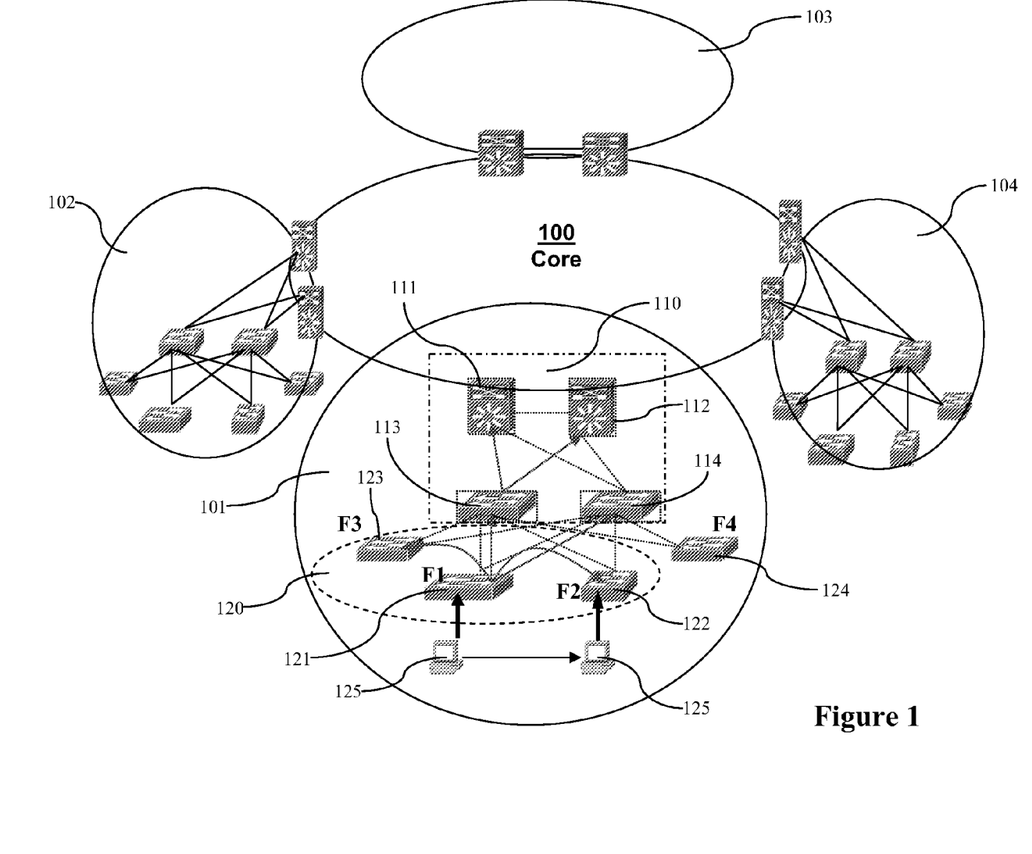
FIG. 1 is a diagram representing a network for use in one embodiment of the present disclosure.
Figure 2:
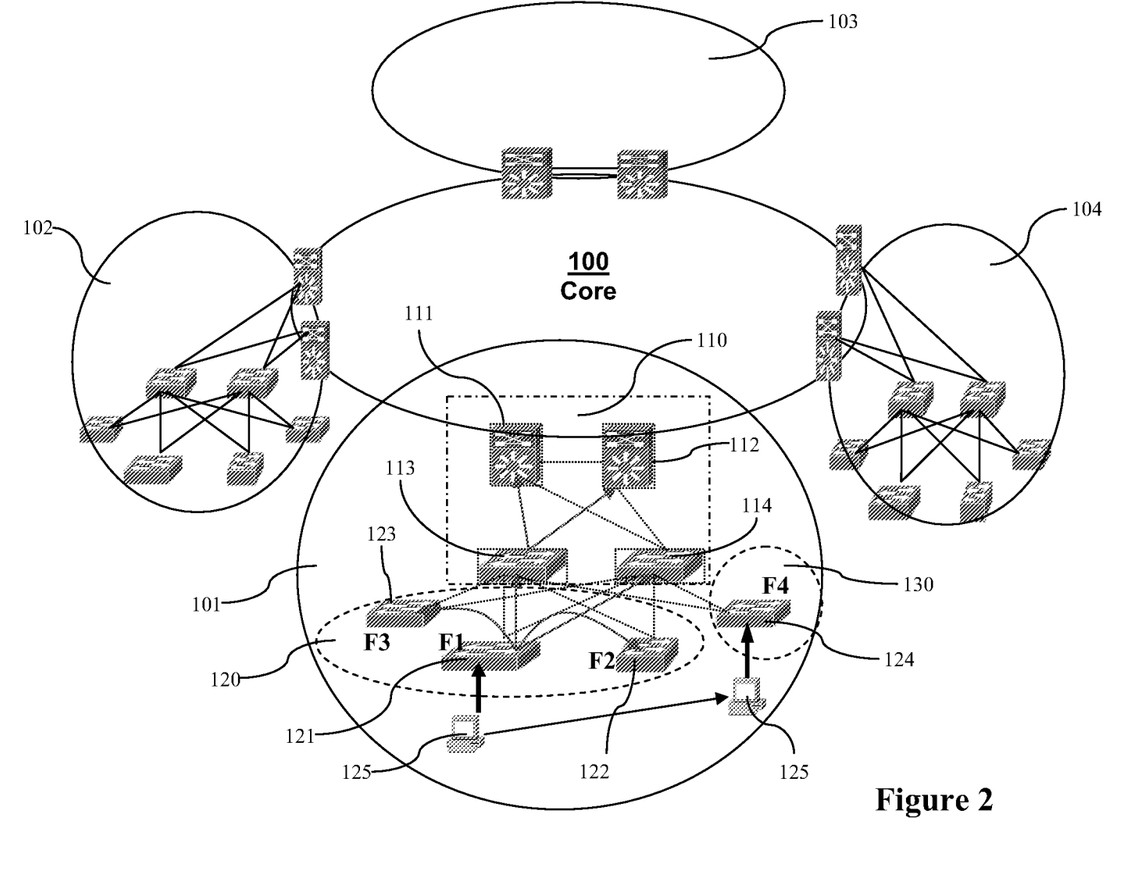
FIG. 2 is a diagram representing a network for use in one embodiment of the present disclosure.

FIGS. 1 and 2 are diagrams representing a network for use in one embodiment of the present disclosure. Referring to FIGS. 1 and 2, the core 100 is a group consisting of core group switches that act as the core switches for each subgroup 101-104 of the network. Each subgroup 101 consists of core group switches 111-112, distribution or intermediary switches 113-114, and access switches, also known as forwarders 121-124, as well as host devices 125, connected to the forwarders 121-124. The subgroup switches are split into two categories, based upon role. The convergence group 110 is the group of switches within the subgroup that includes all the core group switches 111-112 within the subgroup and all the distribution or intermediary switches 113-114, but no forwarders 121-124. The other category is the proximity group 120 switches. Each proximity group 120 is composed entirely of forwarders 121-123 within a certain radio proximity to one another. Referring still to FIGS. 1 and 2, forwarders F1 121, F2 122, and F3 123 are all in the same proximity group 120.

Referring to FIG. 1, in one embodiment, when a host device 125 connects to forwarder 121, the forwarder 121 sends a multicast signal to all the switches in its associated convergence group 110, as well as to all the other forwarders in its associated proximity group 120. The multicast transmission is not forwarded to other proximity groups or non-associated convergence groups, such as non-associated subgroups 102-104. This is because for a machine connected to a forwarder in a different subgroup, or even in a different proximity group, the path in which data destined for the host device 125 is sent, does not change.

For example, if a host device connected to forwarder F4 124, was to send data to a host device connected to forwarder F1, the path required to send the data would be out from forwarder F4 124, towards one of the distribution or intermediary switches 113-114 in the convergence group 110. The distribution or intermediary switch 113-114 would then know that the host device is connected to forwarder F1 121 and forward the data in the direction of forwarder F1. However, should the host device 125 move from forwarder F1 121 to forwarder F2 122, an update would need to be sent to the convergence group 110 switches, including the distribution or intermediary switches 113-114, and the proximity group switches associated with forwarder F2, so the switches would know to send the data towards forwarder F2 122, instead of forwarder F1. However, from the point of view of forwarder F4 124, the path for the data transmission is still the same. To reach the host device 125, forwarder F4 124 still forwards data through the distribution or intermediary switches 113-114 in the convergence group 110. This is why it is not necessary to send an update packet to forwarders in different proximity groups than the proximity groups associated with the forwarders to and from which the host roamed, and similarly, is also why the update packet need not be forwarded to convergence groups located within a different subgroup of the network.

Still referring to FIG. 1, in another embodiment of the present disclosure, in the case where a host device 125 moves between forwarders 121-122 within the same proximity group 120, the update packet need only be transmitted to the proximity group 120 associated with the two forwarder switches 121-122.

Referring to FIG. 2, in the case where a host device 125 moves from a forwarder 121 in one proximity group 120 to a forwarder 124 in another proximity group 130, the update packet would need to be forwarded to the associated convergence group 110, and both the originating proximity group 120 and the destination proximity group 130. Similar to the case where the host device 125 moves from one forwarder to another within the same proximity group 120 as described above, the update packet need only be transmitted to switches wherein the data path changes, such as the convergence group 110 switches and the originating 120 and destination 130 proximity groups.

Referring still FIG. 2, in yet another embodiment of the present disclosure, to further optimize the multicast transmission, the update packet is sent only to the convergence group 110 and the two switches directly associated with the host device movement 121, 124.

Referring to FIGS. 1 and 2, the host update multicast transmission sent to the convergence groups 110 and proximity groups 120,130, can be sent via any number of different protocols, including, but not limited to, Host Information Protocols (HIP), Service Advertisement Framework (SAF), and Open Shortest Path First (OSPF) protocols, such as opaque Link-State Advertisement (LSA).

Figure 3:
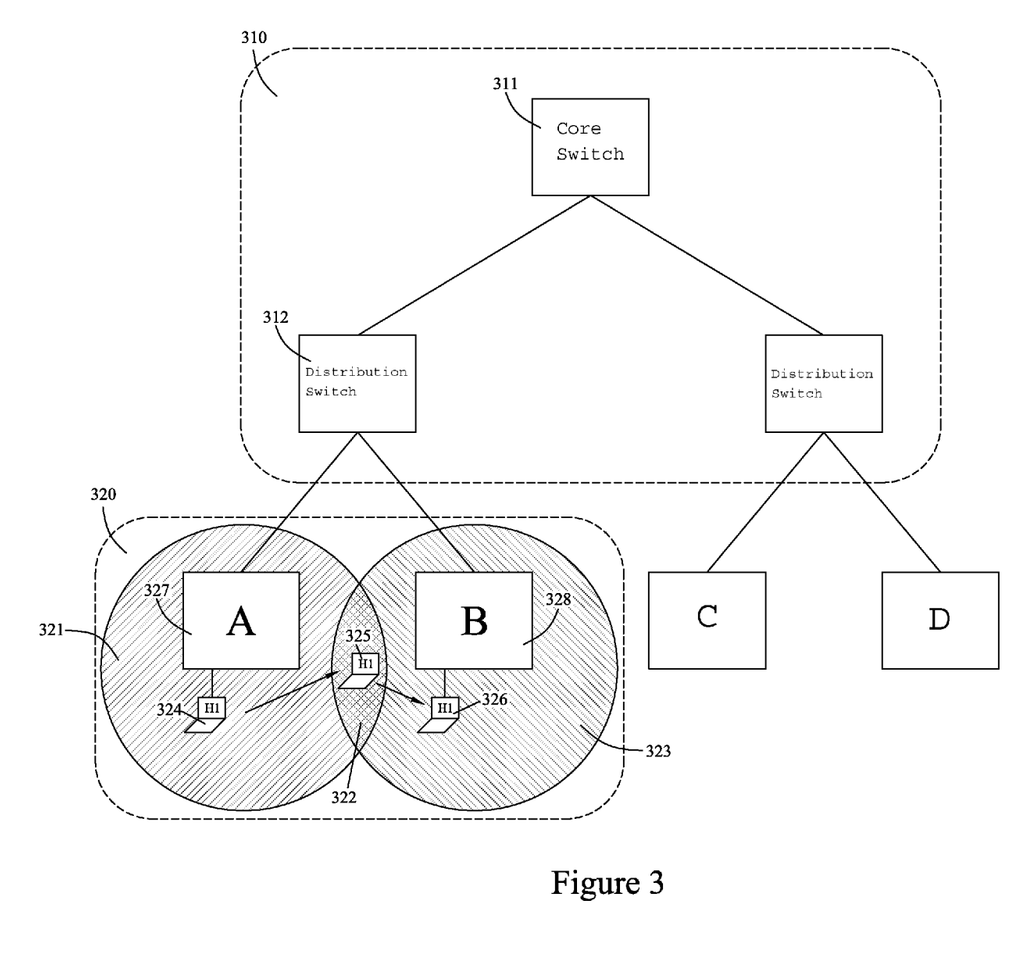
FIG. 3 is a diagram representing one sub-group of a network for use in one embodiment of the present disclosure.

FIG. 3 is a diagram representing one sub-group of a network for use in one embodiment of the present disclosure. Referring to FIG. 3, in another embodiment of the present disclosure, the measures for host route convergence in a network may be a proactive response. When a host device 324 is connected to forwarder A 327, it may be proactively detected that the device 324 is moving in the direction of the radio coverage 323 of forwarder B 328. When the host device is at a point 325, while still in the radio coverage 321 of forwarder A 327, where it becomes clear to the network that the host device is heading from forwarder A 327 to forwarder B 328, an update packet is multicast transmitted to the switches 311-312 in the convergence group 310 and the other switches in the proximity group 320. This update packet allows the policies to be installed in the data plane of the switches preparing them for the impending switch to forwarder B 328. With the preemptive update, the lag time resulting from the switch between forwarder A 327 and forwarder B 328 becomes minimized, and when the host device 326 connects to forwarder B 328, the update packet is already in place.

Figure 4:
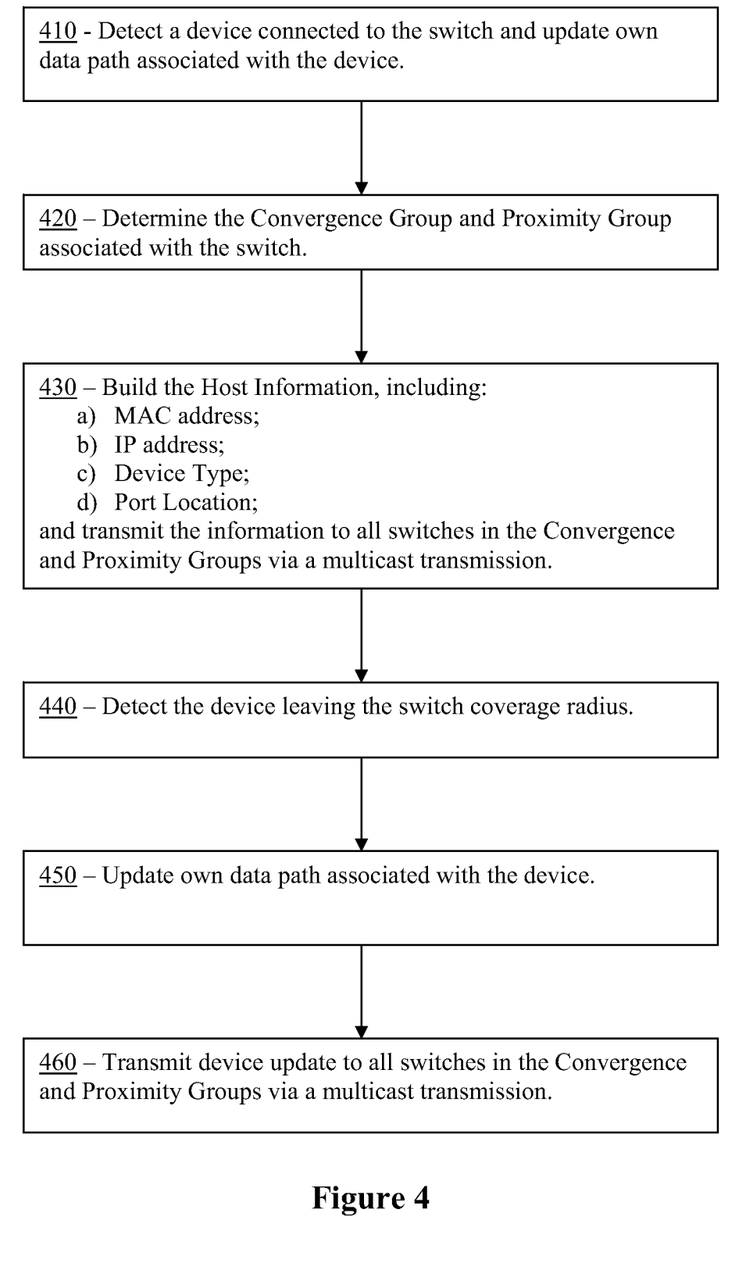
FIG. 4 is a flow chart outlining a routine performed by a forwarder switch in a reactive response embodiment of the present disclosure.

FIG. 4 is a flow chart outlining a routine performed by a forwarder switch in a reactive response embodiment of the present disclosure. Referring to FIGS. 1 and 4, when a host device 125 first connects to the network, a forwarder switch 121 detects the connection and updates its own data path associated with the host device 410. The forwarder 121 then determines which other network switches are in its associated convergence group 110 and its proximity group 420. Upon connection, the forwarder 121 received host information from the host device 125 that includes at least one of the host media access control (MAC) address, internet protocol (IP) address, host device VNET number, device type, and port location. The forwarder 121 may also receive information relating to the host device 125 connection speed and bandwidth requirements. This host information may be transmitted along with a sequence number assigned based on the forwarder switch and port the device is connected to and the forwarder's state and sub-domain ID, via a multicast transmission using preferably, but not limited to, HIP or SAF protocols 430.

As the host device 125 moves through the coverage radius of the forwarder switch 121, the forwarder 121 detects the host device 125 leaving the coverage radius 440. Once the host device 125 has left the coverage radius, the forwarder 121 updates its own data path associated with the host device 125 to allow for data transmission to the device as necessary 450. An update indicating the movement of the host device 125 is then multicast transmitted to the associated convergence 110 and proximity 120 groups 460.

Figure 5:
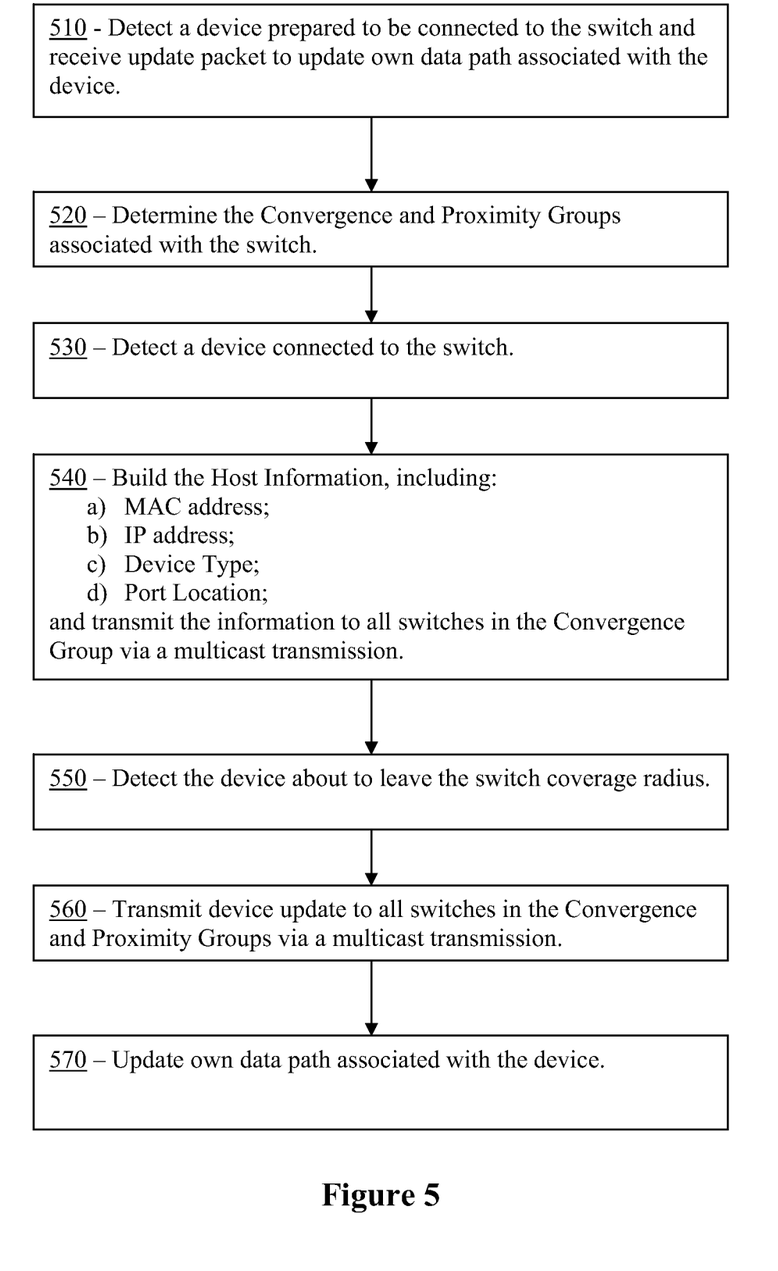
FIG. 5 is a flow chart outlining a routine performed by a forwarder switch in a proactive response embodiment of the present disclosure.

FIG. 5 is a flow chart outlining a routine performed by a forwarder switch in a proactive response embodiment of the present disclosure. Referring to FIGS. 3 and 5, in another embodiment of the present disclosure, the response to the movement of a host device within the network may be a proactive response, meaning the preparation for a device expected to enter a forwarder's coverage radius is performed before the device actually enters the radius, thus reducing the possible lag time caused by the switch from one forwarder to another. The first step by the forwarder 328 is to detect a device 325 prepared to be connected to the forwarder switch 328 and receiving an update packet to update its own data path associated with the device 510. The forwarder 328 would determine the associated convergence 310 and proximity 320 groups 520 before the device 326 is connected to the switch 530.

Upon connection, the forwarder switch 328 receives host information from the host device 326, including at least one of the MAC address, IP address, host device VNET number, device type, port location, and connection speed and bandwidth requirements, and confirms the information to the update received prior to the device connection. The host information may then be transmitted to the other switches in the convergence group 310 and associated proximity group 320 540. When the forwarder 328 detects the host device 326 about to leave its coverage radius 550, the forwarder 328 transmits an update packet to the associated proximity 320 and convergence 310 groups 560, and upon the host device 326 leaving the coverage radius, the forwarder 328 updates its own associated data path 570.

Figure 6:
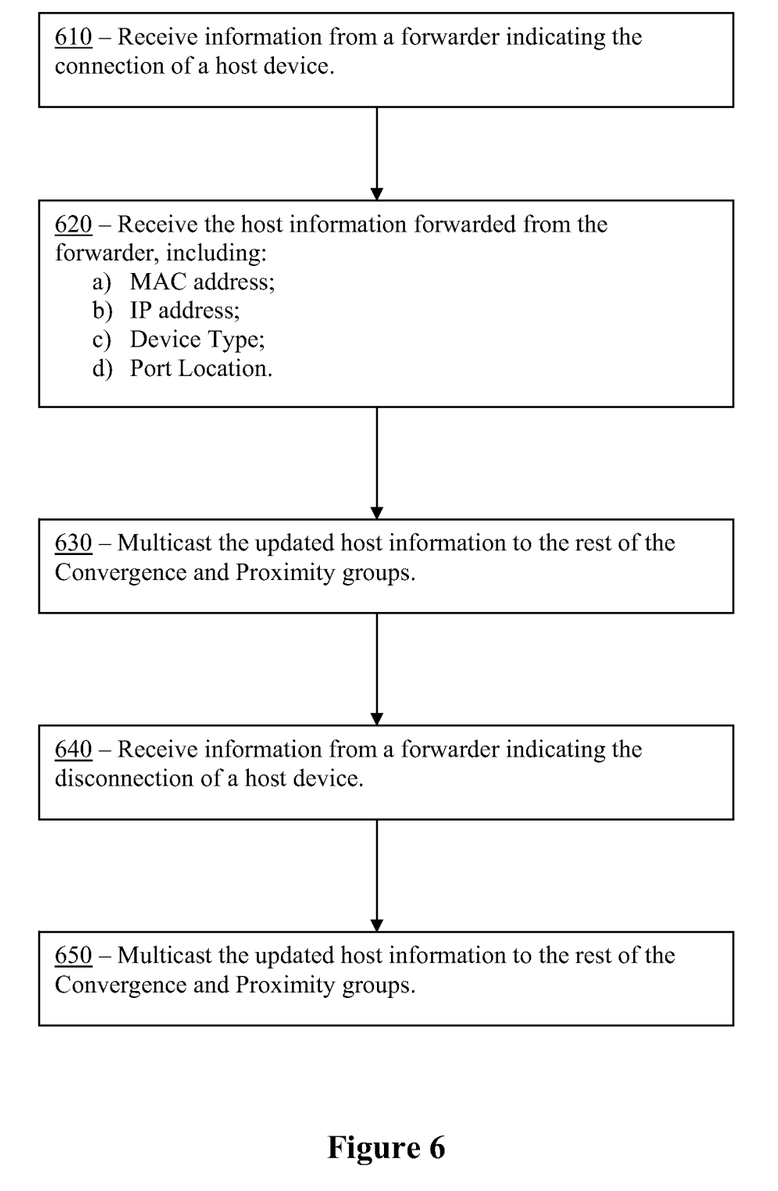
FIG. 6 is a flow chart outlining a routine performed by a switch that is not a forwarder for use in one embodiment of the present disclosure.

FIG. 6 is a flow chart outlining a routine performed by a switch that is not a forwarder for use in one embodiment of the present disclosure. Referring to FIGS. 1 and 6, in yet another embodiment of the disclosure, when a host device 125 connects to the network, an update packet is received by a core switch 111 indicating the connection of a host device 610. The update packet received by the core switch 111 includes at least one of the host device's 125 MAC address, IP address, device type, port location, and connection speed and bandwidth requirements 620. If necessary, the core switch 111 could then forward the update packet to the associated convergence 110 and proximity 120 groups 630. As the connected host device 125 moves to another forwarder 122, the core switch received an update informing of the disconnection of the host device 125 from the forwarder 121 640, and as necessary transmits the update to the rest of the associated convergence and proximity groups 650.

Figure 7:
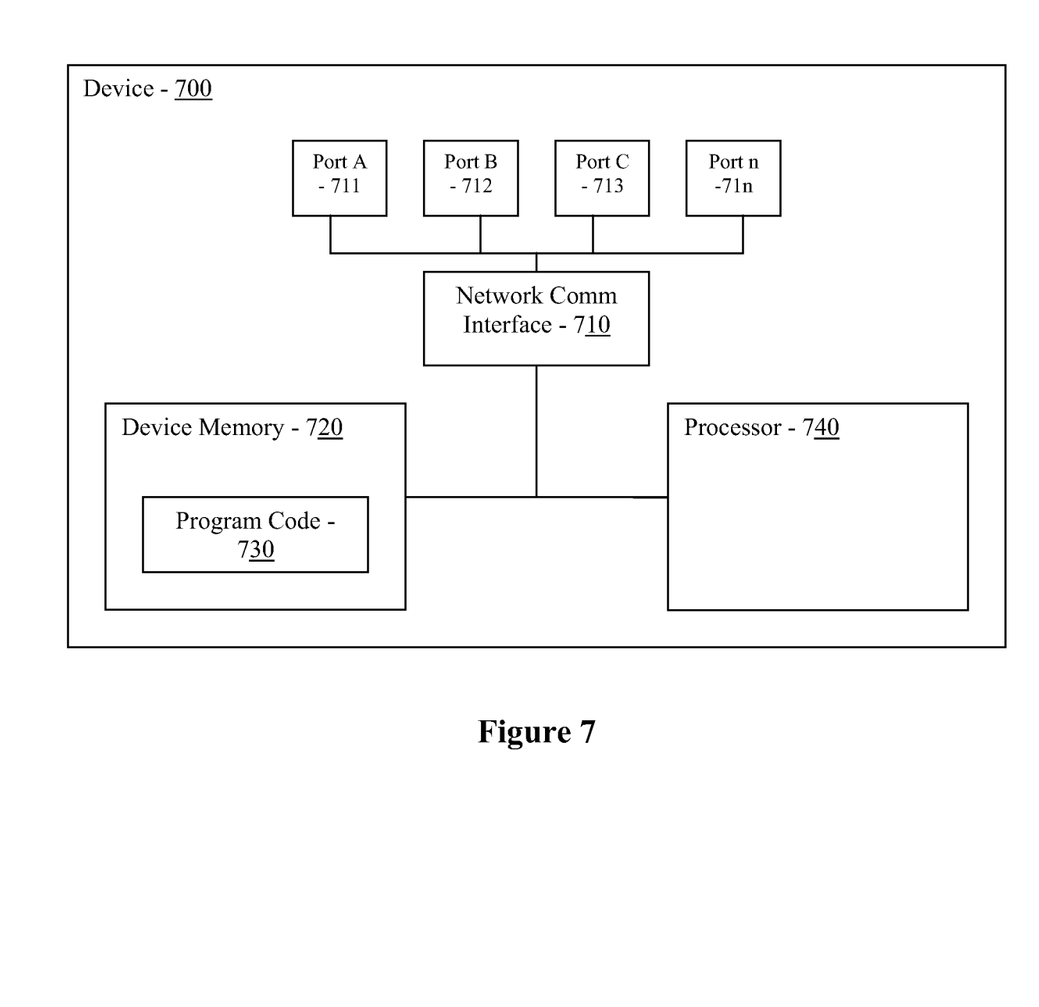
FIG. 7 is a representation of a routing apparatus device for practicing one or more embodiments of the present disclosure.

FIG. 7 is a representation of a routing apparatus device for practicing one or more embodiments of the present disclosure. The device 700 includes a network communication interface 710 with one or more communication terminals 711-71*n*, coupled to one or more processors 740, which will execute a set of instructions 730 encoded onto a memory 720. The program code 730 encoded onto the memory 720 is a set of instructions that when executed by the one or more processors defines the above method of optimized host route convergence by limiting host route updates to proximity and convergence groups.

Most of the wired networks deployed today implement an overlay model, where the traffic to and from a wireless end point is tunneled from the access point to a small collection of wireless switches or controllers deep in the network. This model limits the convergence of a host move to a small set of wireless controllers. However this approach suffers from the limitations that come with centralizing of processing like reduced scalability, reduced availability, reduced security (Denial of Service exploits), etc. To solve this problem, the wireless and wired host processing should be decentralized and handled by the access switches in the network to which the access point and wired end hosts connect to.

This approach also provides wired and wireless feature/policy consistency, important when policy that needs to be on the traffic is oblivious to the access media (wired or wireless) on which the traffic was sent. Such networks are referred to as Integrated Wired and Wireless networks. Integrated Wired and Wireless networks, whether they be 802.11 WiFi or otherwise, require a fast response time when a host device switches from one switch to another. This switch has to be preferably less than 50 ms. The development of the convergence and proximity groups allows for multicasting of update packets to be optimized by only sending the update to the switches that are directly affected by the change in host port. This becomes substantially important as the size of networks continues to grow, where the network is composed of tens of core switches, hundreds intermediary switches, and up to thousands of access switches, or forwarders, connected to up to thousands of host devices. This many devices would cause too many updates to be sent to every switch in a domain or network.

Embodiments of the present disclosure limits the number of updates to a limited set of switches so that the update will be received and processed by only a necessary and sufficient set of switches. These switches are clustered into proximity groups and convergence groups, which is detailed below. By limiting the number of updates to only the associated proximity and convergence groups, the number of messages propagated in the network is substantially decreased, thus reducing the CPU utilization and network bandwidth utilization, and therefore improving the scalability and network convergence times.

The development of the convergence and proximity groups allows for a multicast transmission of update packets to a limited set of switches that are directly effected by the host movement, in effect allowing the host processing to be handled by the access switches to which the host devices are connected. By limiting the number of updates to only the associated proximity and convergence groups, the number of messages propagated in the network is substantially decreased, thus reducing the CPU utilization and network bandwidth utilization, thus improving the scalability of the network and reducing the network convergence response times. This provides wired and wireless feature/policy consistency as well as an optimized response time, preferably less than 50 ms, to host movement between access switches.

Methods and system for providing host route convergence by limiting host route updates to proximity and convergence groups in accordance with various embodiments of the present disclosure are disclosed. The proximity groups are made up of the forwarder switches in the network that are within a certain radio range of each other, and the convergence groups are all the switches that are not forwarders within a certain subgroup of the core tree of the network. With the update packets being sent to only the required switches in the network, the network traffic is lessened, the CPU cycles spent by the network devices are lessened, and the route convergence times are reduced for more optimized performance and a lowered chance of traffic data loss.

Accordingly, a method for host route convergence in a network includes detecting a host device on a port of a forwarder switch in the network, detecting the movement of the host device from one forwarder switch to another, and multicast transmitting the updated device information for the host device to the convergence group switches and its own proximity group switches only, where the convergence group switches is a cluster of all the switches in the network that are not acting as forwarder switches, and the proximity group switches are a group of forwarder switches grouped together based on radio proximity.

The updated host device information may include one or more of the host's MAC address, IP address, a sequence number assigned based on the switches and port the host device is connected to, the host's VNET number, and the state and sub-domain ID of the forwarder to which the host is connected.

In one aspect, if the host device moves from one forwarder to another forwarder within the same proximity group, the updated device information may be configured to only multicast to the proximity group.

The updated device information may include multicast only to the convergence group switches and the two forwarder switches directly associated with the host device movement.

The network may include a wireless network and the host device is a wireless device, where the network may include an 802.11 WiFi network.

The response time of a movement of the host device from one forwarder to another in one aspect may be less than approximately 50 ms.

The host device information may include information determining the connection speed and bandwidth required by the host device.

The response to the detection of movement of the host device may be a reactive response.

The response to the detection of movement of the host device may include a proactive response performed by triangulating the position of the host device and preemptively reacting to a movement from one forwarder switch to another.

The multicast transmission may be performed with Host Information Protocol, or with Service Advertisement Framework protocol, or Open Shortest Path First protocol.

An apparatus in particular embodiments includes a network interface, one or more processors coupled to the network interface, and a memory for storing instructions which, when executed by the one or more processors, causes the one or more processors to detect a host device on a port of a forwarder switch in a network, detect a movement of the host device from a first forwarder switch to a second forwarder switch, and multicast broadcast an updated device information for the host device to a convergence group switches including switches that are not configured as forwarder switches and a proximity group switches including forwarder switches grouped together based on radio proximity.

The updated host device information in one aspect may include one or more of the host's MAC address, IP address, a sequence number assigned based on the switches and port the host device is connected to, the host's VNET number, or the state and sub-domain ID of the forwarder to which the host is connected.

In a further embodiment, when the host device moves from the first forwarder switch to a second forwarder switch within the same proximity group, the one or more processors may be configured to multicast the updated device information to the proximity group.

The one or more processors may be configured to multicast the updated device information only to the convergence group switches and the two forwarder switches directly associated with the host device movement.

The network may include a wireless network such as an 802.11 Wifi network and the host device may include a wireless device.

The response time of a movement of the host device from one forwarder to another may be less than approximately 50 ms.

The host device information may include connection speed and bandwidth information for the host device.

The response to the detection of movement of the host device in particular embodiments may include a reactive response.

The response to the detection of movement of the host device may include a proactive response, and further, where the one or more processors may be configured to generate the proactive response by triangulating a position of the host device and to preemptively react to a movement between a plurality of forwarder switches.

The one or more processors may be configured to multicast broadcast based on one of Host Information protocol, Service Advertisement Framework protocol, or Open Shortest Path First protocol.

An apparatus in particular embodiments of the present disclosure includes means for detecting a host device on a port of a forwarder switch in a network, means for detecting a movement of the host device from a first forwarder switch to a second forwarder switch, and means for multicast broadcasting an updated device information for the host device to a convergence group switches and a proximity group switches, where the convergence group switches includes switches in the network that are not configured as forwarder switches, and the proximity group switches include forwarder switches grouped together based on radio proximity.

Various other modifications and alterations in the structure and method of operation of the particular embodiments will be apparent to those skilled in the art without departing from the scope and spirit of the disclosure. Although the disclosure has been described in connection with specific particular embodiments, it should be understood that the disclosure as claimed should not be unduly limited to such particular embodiments. It is intended that the following claims define the scope of the present disclosure and that structures and methods within the scope of these claims and their equivalents be covered thereby.

What is claimed is:

1. A method, comprising:
   detecting a host device on a port of a first forwarder switch in a network;
   detecting a movement of the host device from the first forwarder switch to a second forwarder switch; and
   in response to the movement of the host device, multicasting updated device information for the host device that includes at least one address of the host device to a plurality of switches of a convergence group of a subgroup within the network and a plurality of switches of a proximity group of the subgroup, without forwarding the updated device information for the host device to one or more other forwarder switches of the subgroup that are not members of the proximity group and without forwarding the updated device information for the host device to other subgroups within the network,
   wherein the convergence group includes core switches in the network, that are not configured as forwarder switches of the subgroup but that provide a path between forwarder switches of the subgroup and the other subgroups within the network, and
   wherein the proximity group includes forwarder switches of the subgroup that are grouped together based on radio proximity.

2. The method of claim 1, wherein the updated device information includes one or more of the host's MAC address, IP address, a sequence number assigned based on the switches and port the host device is connected to, the host's VNET number, or the state and sub-domain ID of the forwarder to which the host is connected.

3. The method of claim 1, wherein the first forwarder switch and the second forwarder switch are both within the proximity group of the subgroup, and the updated device information for the host device is prevented from being forwarded to other proximity groups of the subgroup.

4. The method of claim 1, wherein the updated device information is multicast only to the switches of the convergence group of the subgroup and two forwarder switches of the proximity group of the subgroup that are directly associated with the host device's movement.

5. The method of claim 1, wherein the network is a wireless network and the host device includes a wireless device.

6. The method of claim 5, wherein the network is an 802.11 WiFi network.

7. The method of claim 5, wherein a response time to the movement of the host device from the first forwarder switch to the second forwarder switch is less than 50 ms.

8. The method of claim 5, wherein the updated device information includes connection speed and bandwidth information for the host device.

9. The method of claim 5, wherein the multicasting is performed in response to the detection of movement of the host device as a reactive response.

10. The method of claim 5, wherein the multicasting is performed in response to the detection of movement of the host device as a proactive response, that includes triangulating a position of the host device and preemptively reacting to a movement between a plurality of forwarder switches.

11. The method of claim 1, wherein the multicasting is performed with one of Host Information protocol, Service Advertisement Framework protocol, or Open Shortest Path First protocol.

12. An apparatus, comprising:
   a network interface;
   one or more processors coupled to the network interface; and
   a memory for storing instructions which, when executed by the one or more processors, causes the one or more processors to
   detect a host device on a port of a first forwarder switch in a network;
   detect a movement of the host device from the first forwarder switch to a second forwarder switch; and
   in response to the movement of the host device, multicast updated device information for the host device that includes at least one address of the host device to a plurality of switches of a convergence group of a subgroup within the network that includes core switches that are not configured as forwarder switches of the subgroup but that provide a path between forwarder switches of the subgroup and the other subgroups within the network, and to a plurality of switches of a proximity group of the subgroup that includes forwarder switches of the subgroup that are grouped together based on radio proximity, without forwarding the updated device information for the host device to one or more other forwarder switches of the subgroup that are not members of the proximity group and without forwarding the updated device information for the host device to other subgroups within the network.

13. The apparatus of claim 12, wherein the updated device information includes one or more of the host's MAC address, IP address, a sequence number assigned based on the switches and port the host device is connected to, the host's VNET number, or the state and sub-domain ID of the forwarder to which the host is connected.

14. The apparatus of claim 12, wherein the first forwarder switch and the second forwarder switch are both within the proximity group of the subgroup, and the updated device information for the host device is prevented from being forwarded to other proximity groups of the subgroup.

15. The apparatus of claim 12, wherein the one or more processors are configured to multicast the updated device information only to the switches of the convergence group of the subgroup and two forwarder switches of the proximity group of the subgroup directly associated with the host device's movement.

16. The apparatus of claim 12, wherein the network is a wireless network and the host device includes a wireless device.

17. The apparatus of claim 16, wherein the network is an 802.11 WiFi network.

18. The apparatus of claim 16, wherein a response time to the movement of the host device from the first forwarder switch to the second forwarder switch is less than 50 ms.

19. The apparatus of claim 16, wherein the updated device information includes a connection speed and bandwidth information for the host device.

20. The apparatus of claim 16, wherein the instructions when executed by the one or more processors cause the multicast to be performed in response to the detection of movement of the host device as a reactive response.

21. The apparatus of claim 16, wherein the instructions when executed by the one or more processors cause the multicast to be performed in response to the detection of movement of the host device as a proactive response that includes triangulation of a position of the host device and preemptive reaction to a movement between a plurality of forwarder switches.

22. The apparatus of claim 12, wherein the one or more processors are configured to multicast based on one of Host Information protocol, Service Advertisement Framework protocol, or Open Shortest Path First protocol.

23. The method of claim 1, wherein the first forwarder switch is within the proximity group of the subgroup and the second forwarder switch is within a second proximity group of the subgroup, and the updated device information for the host device is multicast to both the proximity group of the subgroup and the second proximity group of the subgroup.

24. The apparatus of claim 12, wherein the first forwarder switch is within the proximity group of the subgroup and the second forwarder switch is within a second proximity group of the subgroup, and the instructions, when executed by the one or more processors, further cause the one or more processors to multicast the updated device information for the host device to both the proximity group of the subgroup and the second proximity group of the subgroup.

25. The method of claim 1, wherein the updated device information is used to identify a new host route for the host device.

* * * * *